(12) United States Patent
Seo

(10) Patent No.: US 7,145,594 B2
(45) Date of Patent: Dec. 5, 2006

(54) DIGITAL VIDEO SIGNAL PROCESSING APPARATUS OF MOBILE COMMUNICATION SYSTEM AND METHOD THEREOF

(75) Inventor: Kwang-Deok Seo, Gyunggi-Do (KR)

(73) Assignee: LG Electronics Inc., Seoul (KR)

(*) Notice: Subject to any disclaimer, the term of this patent is extended or adjusted under 35 U.S.C. 154(b) by 261 days.

(21) Appl. No.: 10/693,915

(22) Filed: Oct. 28, 2003

(65) Prior Publication Data
US 2005/0012812 A1    Jan. 20, 2005

(30) Foreign Application Priority Data
Jul. 18, 2003    (KR) ...................... 10-2003-0049382

(51) Int. Cl.
*H04N 7/15* (2006.01)
(52) U.S. Cl. ................................ 348/14.09; 379/14.02
(58) Field of Classification Search ... 348/14.01–14.16
See application file for complete search history.

(56) References Cited

U.S. PATENT DOCUMENTS 6,441,842 B1* 8/2002 Fandrianto et al. ...... 348/14.13

2001/0047300 A1* 11/2001 Takashima et al. ........... 705/14
2003/0169935 A1*  9/2003 Sano et al. .................. 382/240
2003/0194013 A1* 10/2003 Alvarez ................. 375/240.24
2003/0223498 A1* 12/2003 Park et al. ............. 375/240.24

FOREIGN PATENT DOCUMENTS

| JP | 63-276938 | 11/1988 |
| JP | 06-70040 | 3/1994 |
| JP | 09-065312 | 3/1997 |
| JP | 09-130798 | 5/1997 |
| JP | 10262228 | 9/1998 |
| JP | 2000-507418 | 6/2000 |
| JP | 2001-069474 | 3/2001 |
| JP | 2002238030 | 8/2002 |
| KR | 100316639 | 11/2001 |

* cited by examiner

*Primary Examiner*—Stella Woo
(74) *Attorney, Agent, or Firm*—Fleshner & Kim LLC

(57) ABSTRACT

A digital video signal processing apparatus for providing video conferencing services in a mobile communication system includes a plurality of mobile terminals each having a video camera and a MCU (multipoint control unit) for mixing video signals received from the video conference terminals to generate a composite signal and for transmitting the composite signal to each of the terminals.

39 Claims, 6 Drawing Sheets

DIGITAL VIDEO SIGNAL PROCESSING APPARATUS OF MOBILE COMMUNICATION SYSTEM AND METHOD THEREOF

BACKGROUND OF THE INVENTION

1. Field of the Invention

The present invention relates to video signal processing, and more particularly to a system and method for processing video signals transmitted among a plurality of users during a video conference.

2. Background of the Related Art

Various multimedia services have been provided through a mobile communication terminal, and recently users have taken an interest in video communication services.

First-generation video communication services provided point-to-point service. Recently, research has focused on providing multipoint video communication services based on the first-generation video communication service. To provide multipoint video communication services, video signals must be efficiently processed from a plurality of users.

Video conference is a representative example of a multipoint video communication service. In a video conference system, plural participants exchange images and voices through their terminals.

FIG. 1 is a block diagram illustrating a general multipoint video conference system, where there are four participants. The system includes plural video conference terminals 10 each having a video camera 10a, and a MCU (multipoint control unit) 20 for processing/converting video signals from each of the video conference terminals 10 and then generating a new video signal based on each of those signals.

The MCU maintains and manages a multipoint video conference based on a H.32x terminal standard. This involves generating and transmitting a new video signal to each of the video conference terminals in a resolution appropriate to each of the video conference terminals. To perform these functions, the MCU 20 includes a video signal processing unit (not shown) for converting a video signal transmitted from each video conference terminal into a video signal format appropriate to the video conference. In FIG. 1, the dotted lines represent coded video signals transmitted from the terminals to the MCU, and the solid lines represent re-coded video signals transmitted from the MCU to the terminals.

FIG. 2 is a block diagram of a video signal processing operation performed by an MCU in accordance with the related art. As shown, the MCU includes a decoding unit 21, a down scaling unit 22, a re-coding unit 23, and a mixer 24. The decoding unit decodes a video signal received from a plurality of video conference terminals into DCT (discrete cosine transform) signals or pixel units. The down scaling unit reduces resolution of a decoded signal outputted from the decoding unit. The re-coding unit re-codes each video signal outputted from the down scaling unit 22. And, the mixer mixes video signals coded through the re-coding unit and transmits it to the video conference terminals.

Referring to FIG. 3, the decoding unit 21 includes an inverse VLC (variable length coding) unit 21a for performing inverse VLC of a coded video signal transmitted from the video conference terminal, an inverse DCT (discrete cosine transform) unit 21b for performing inverse DCT of an output signal of the inverse VLC unit 21b, and an inverse quantizing unit 21c for performing inverse quantization of an output signal of the inverse DCT unit 21b. The output signal of the inverse DCT unit 21b is output through the inverse quantizing unit 21c by pixel units.

The down scaling unit 22 reduces resolution of the video signal output from the decoding unit 21 as ½, ¼, . . . , $½^n$, where n is natural number not less than 1.

The re-coding unit 23 includes a quantizing unit 23a for quantizing an output signal of the down scaling unit 22, a DCT unit 23b for performing discrete cosine conversion of an output signal of the quantizing unit 23a, and a VLC unit 23c for performing variable length coding of the output signal of the DCT unit 23b.

Operation of the related-art MCU will now be described. Initially, plural video signals input from each video conference terminal to the decoding unit 21 are decoded into a DCT domain or a pixel domain. A resolution reduction algorithm is applied to each output signal of the decoding unit 21 in the down scaling unit 22, and each output signal is re-coded in the re-coding unit 23. The video signals output from the re-coding unit 23 are mixed and the resulting signal is transmitted to the video conference terminals. In performing DCT domain processing, each video signal transmitted to the decoding unit 21 passes through the inverse DCT unit 21b. In performing pixel domain processing, each video signal received by the decoding unit 21 passes through the inverse quantizing unit 21c.

Both the video signal decoding process through the inverse DCT unit 21a and the inverse quantizing unit 21b and the video signal coding process through the quantizing unit 23a and the DCT unit 23b include loss coding characteristics. In the related-art MCU described above, by applying decoding and coding having loss coding characteristics consecutively for video signal processing, picture quality may be deteriorated.

In addition, in the related-art MCU, by processing a video signal through the inverse DCT unit, the inverse quantizing unit, the quantizing unit and the DCT unit consecutively, video signal processing time may be delayed. More specifically, because video signal processing is performed only by the MCU, the time required for performing video signal processing may be delayed and picture quality of the processed video signal may be deteriorated.

SUMMARY OF THE INVENTION

An object of the present invention is to overcome one or more problems of the related art described above.

Another object of the present invention to provide a system and method for processing digital video signals more efficiently for purposes of providing a multipoint video conference service to a plurality of terminals.

Another object of the present invention is to implement the aforementioned system and method in a mobile communication system, wherein the conference terminals include one or more mobile communication terminals.

In order to achieve these and other objects and advantages, the present invention provides in one embodiment a digital video signal processing apparatus for a mobile communication system which includes plural video conference terminals each having a video camera, and an MCU (multipoint control unit) for mixing video signals received from the video conference terminals and transmitting the mixed signal to each of the video conference terminals.

A digital video signal processing apparatus for a mobile communication system in accordance with another embodiment of the present invention includes a converter for converting a video signal received through a video camera into a digital video signal; a down scaling unit for reducing resolution of the digital video signal; an encoding unit for compressing an output signal of the down scaling unit and transmitting it through a transmitting unit; an inverse VLC unit for decoding a received video signal through inverse variable length coding; an address setting unit for setting a macroblock address of a video signal outputted from the inverse VLC unit; a VLC unit for compressing an address set-video signal through variable length coding; and a mixer for outputting a final image by mixing plural video signals.

A digital video signal processing method for a mobile communication system in accordance with another embodiment of the present invention includes reducing resolution of a video signal taken by a video camera and transmitting it to a MCU (multipoint control unit); and transmitting a final image obtained by mixing/arranging received video signals to each video conference terminal.

A digital video signal processing method for a mobile communication system in accordance with another embodiment of the present invention includes converting a video signal received through a video camera into a digital video signal format; reducing resolution of a digital video signal; compressing the resolution-reduced video signal and transmitting it to a MCU (multipoint control unit); decoding each video signal through inverse variable length coding by the MCU; setting a macroblock address of the decoded video signal; encoding each video signal through variable length coding; and mixing encoded each video signal and transmitting it to the video conference terminal.

DETAILED DESCRIPTION OF PREFERRED EMBODIMENTS

A digital video signal processing apparatus of a mobile communication system in accordance with one embodiment of the present invention includes plural video conference terminals each having a video camera and an MCU (multipoint control unit) for generating a new video signal obtained by mixing video signals from the video conference terminals then transmitting the new video signal to each of the video conference terminals. In the MCU in accordance with the present invention, a down scaling process is not performed in the MCU as is the case with the related art. Instead, the down scaling process is performed in each of the video conference terminals.

Figure 1:
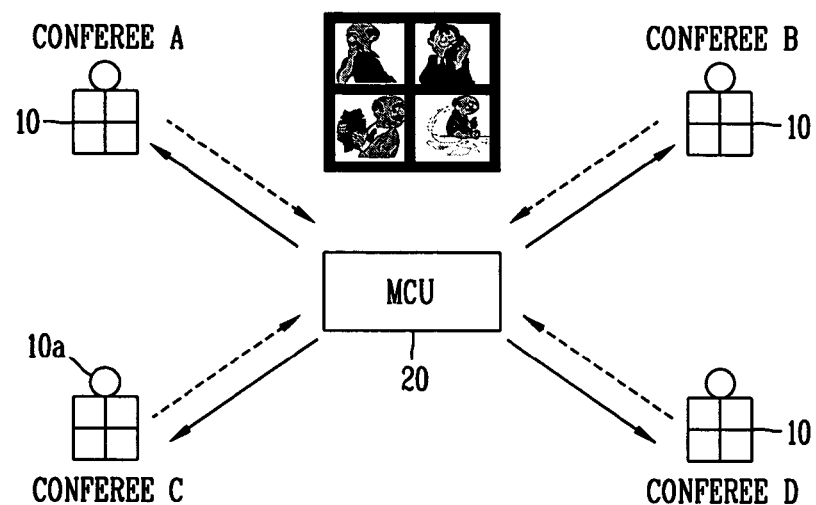
FIG. 1 is a block diagram illustrating the general configuration of a multipoint video conference system.
Figure 2:
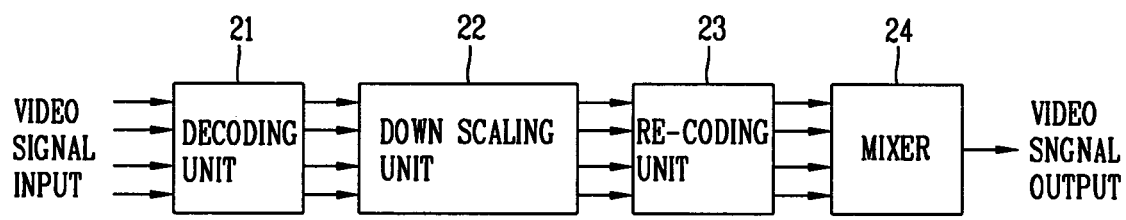
FIG. 2 is a block diagram illustrating a construction of a MCU (multipoint control unit) of the system in accordance with the related art.
Figure 3:
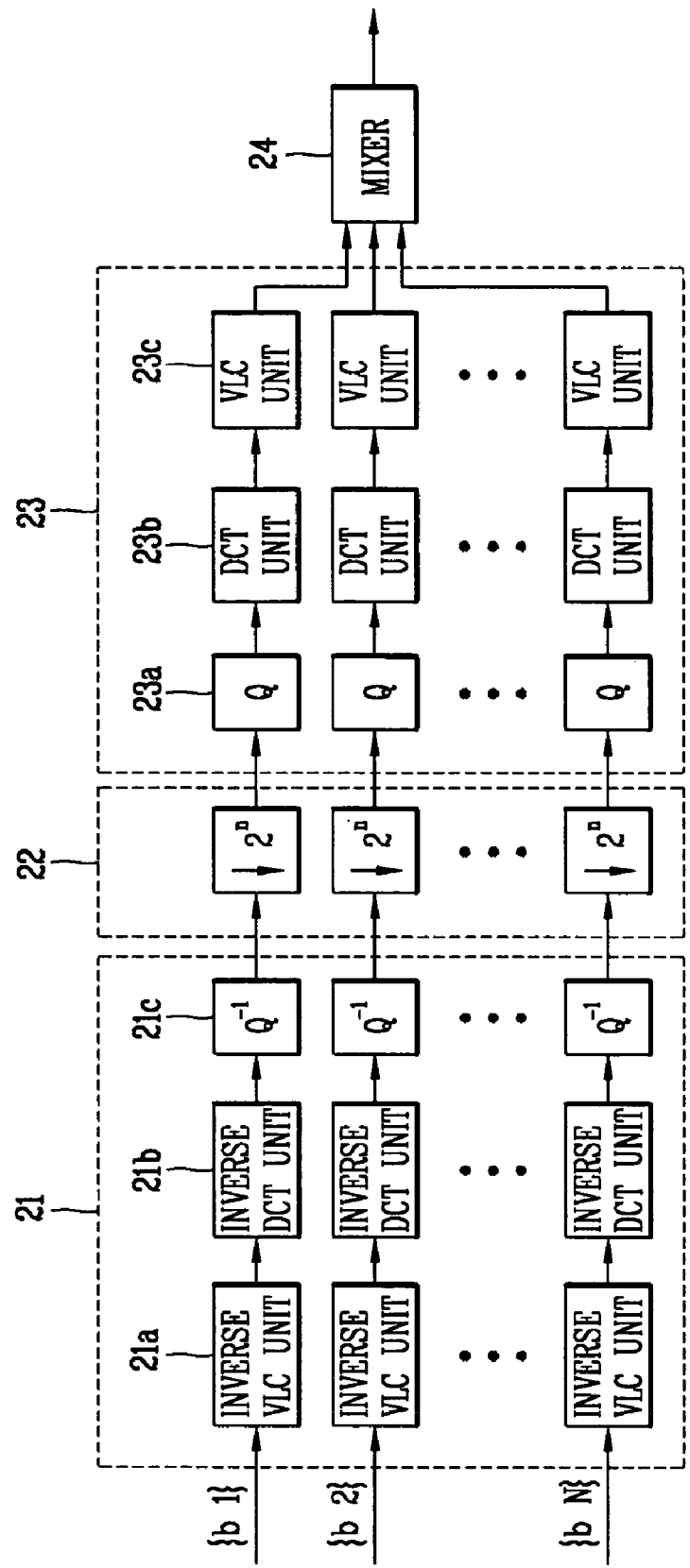
FIG. 3 is a block diagram illustrating a detailed construction of the MCU in FIG. 2.
Figure 4:
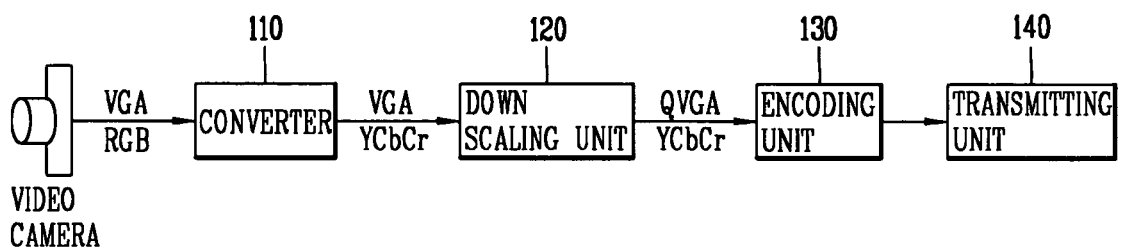
FIG. 4 is a block diagram illustrating a video conference terminal in accordance with and embodiment of the present invention.

FIG. 4 is a block diagram of a video conference terminal in accordance with the present invention. This terminal includes a converter 110 for converting an image of one or more video conference participants input through a video camera into a format for digital video signal processing. A down scaling unit 120 reduces resolution of the video signal output from the converter 110 and an encoding unit 130 codes the video signal output from the down scaling unit 120 in accordance with a predetermined video standard such as but not limited to the MPEG-4 standard. Transmitting unit 140 transmits the video signal output from the encoding unit 130 to an MCU.

The image received through the video camera may be a VGA (video graphic array) signal in an RGB (Red-Green-blue) format. This signal is converted into a VGA signal of a YCbCr format through the converter 110. Herein, the YCbCr format is a format for digital video signal-processing a RGB format video signal, where Y indicates a luminance signal and Cb and Cr indicate color difference signals.

The down scaling unit 120 reduces resolution of the YCbCr format VGA signal output from the converter 110 into a YCbCr format with reduced resolution QVGA (quarter VGA) signal. The QVGA signal output from the down scaling unit 120 is transmitted to the MCU by unit 140, after passing through the encoding unit 130. The down scaling unit 120 may reduce resolution of the video signal in accordance with any one of a variety of techniques, including but by no means limited to applying a sub-sampling method or a down-sampling method.

Figure 5:
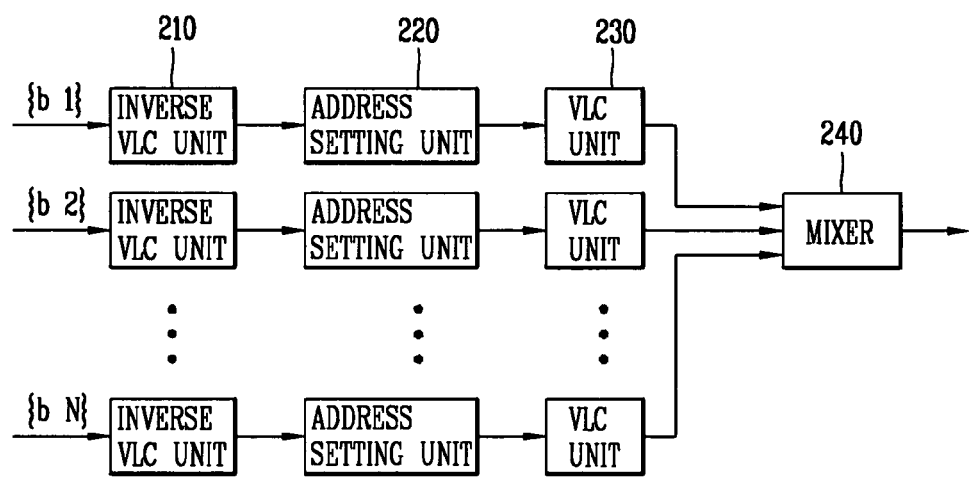
FIG. 5 is a block diagram illustrating one possible construction of a MCU (multipoint control unit) in accordance with the present invention.

FIG. 5 is a block diagram illustrating an embodiment of an MCU in accordance with the present invention. The MCU includes inverse VLC units 210 for performing inverse variable length-coding for respective video signals received from the video conference terminals, address setting units 220 for designating macroblock addresses of respective signals outputs from the inverse VLC units 210, and VLC units 230 for variable length-coding respective video signals output from address setting units 220. A mixer 240 mixes the video signals output from the VLC units 230 based on domain arrangement.

The MCU preferably mixes only the resolution-reduced video signals received from the video conference terminal and transmits the mixed signal to each of the video conference terminals. Because it is possible to perform the mixing process in a VLC region, there is no need to perform decoding a pixel domain or a DCT domain. Accordingly, the MCU of the present invention may include only an inverse VLC unit 210 for performing a no-loss coding process and a VLC unit 230.

The address setting unit 220 sets a macroblock address by considering where an image transmitted from each video conference terminal is to be arranged at a position within a final video image. MB_addr_increment field preferably exists in an MPEG standard syntax and reduces a code quantity by coding not a present macroblock absolute address but a difference value (different) from a previous macroblock address.

Figure 6:
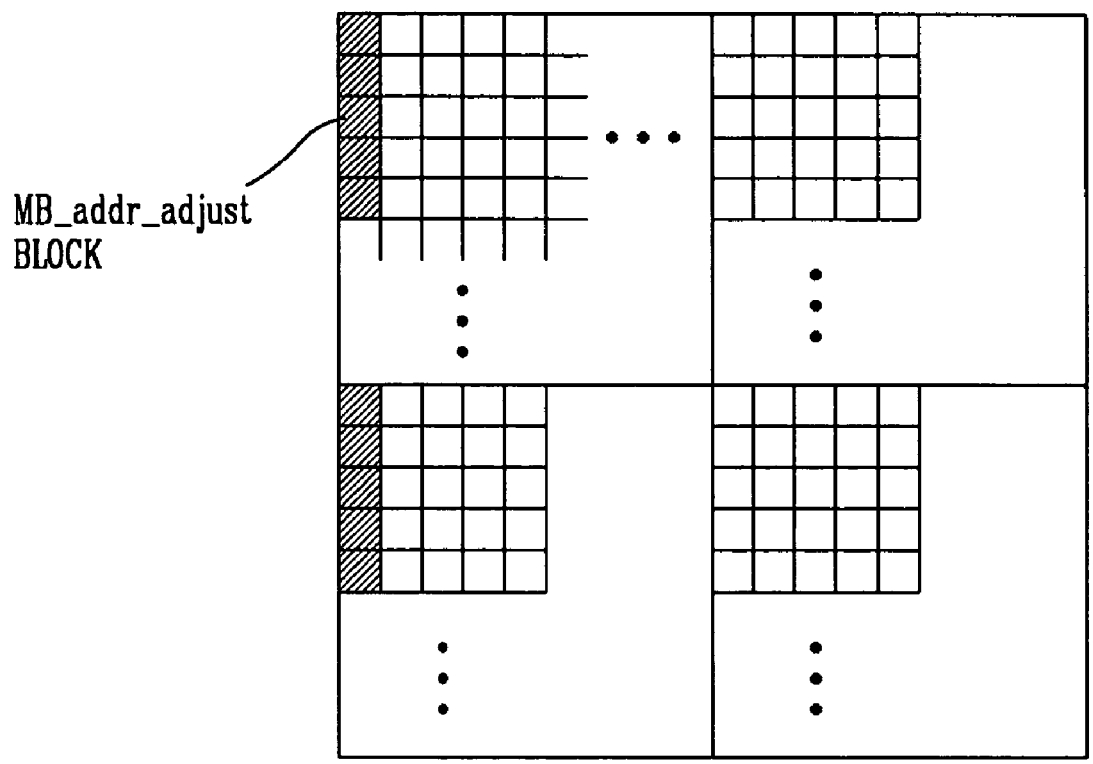
FIG. 6 illustrates a position of a macroblock processed in an address setting unit of the MCU in accordance with the present invention.

FIG. 6 illustrates exemplary positions of macroblocks processed in the address setting unit in accordance with the present invention, where there are four video reference participants. As shown, the final image includes an image of each of the four participants. To reduce a code quantity, an absolute address is set by applying a MB_addr_adjust block only for an address of a macroblock placed at the left of each slice and an address difference value is coded in the rest macroblocks. Accordingly, computational complexity can be reduced. Herein, the MB_addr_adjust block designates an absolute address of a macroblock in consideration of an arrangement in a final video image mixed in the MCU.

More specifically, the MB_addr_adjust block is not applied for all macroblock addresses respectively positioned at the left of four images. Instead, the MB_addr_adjust block is applied only for a macroblock address existing on the left in a final image. In a macroblock address existed on the right in the final image, a difference value (different) from a previous macroblock is coded-displayed as a MB_addr_increment field.

Figure 7:
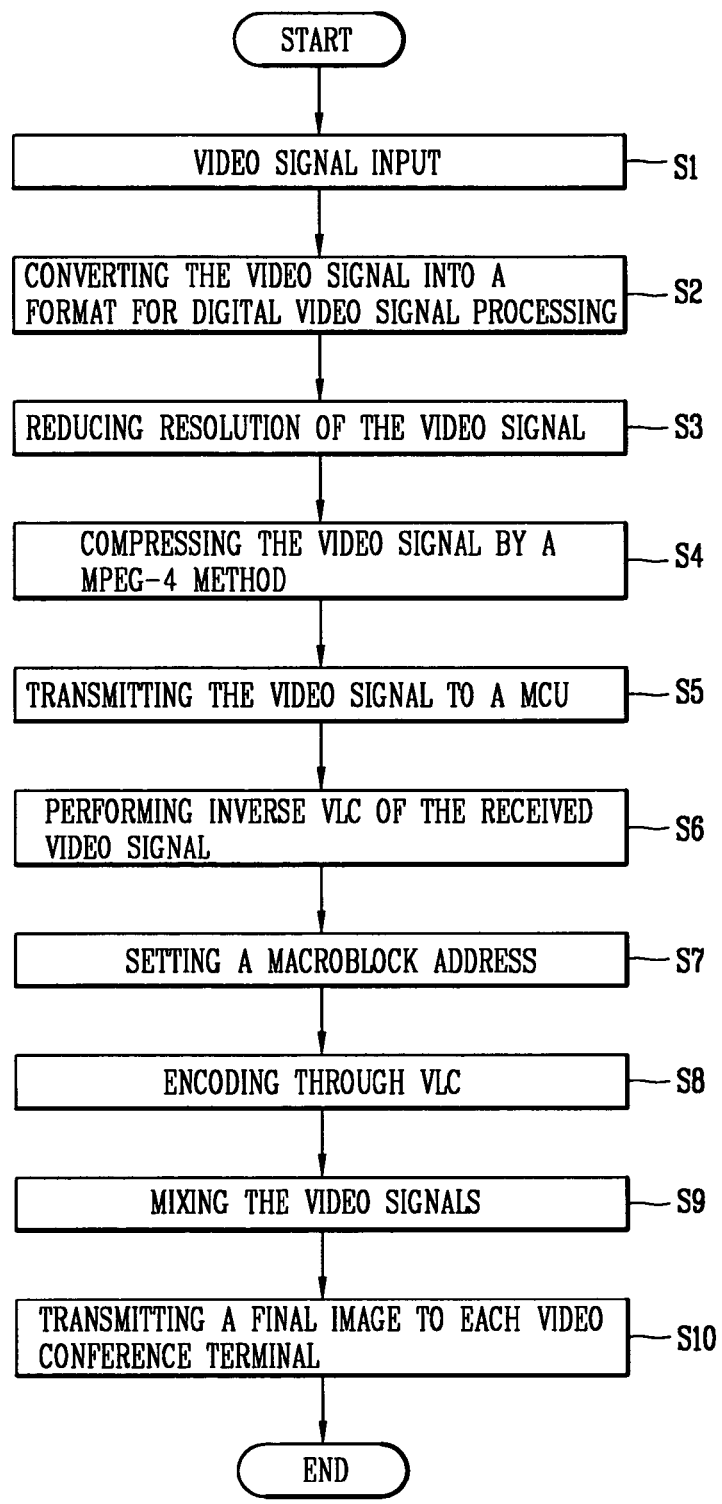
FIG. 7 is a flow chart showing steps included in a digital video signal processing method for a mobile communication system in accordance with an embodiment of the present invention.

FIG. 7 is a flow chart showing steps included in a digital video signal processing method of a mobile communication system in accordance with an embodiment of the present invention. The method includes each video conference terminal reducing resolution of a video signal received through a video camera and then transmitting the reduced-resolution video signal to the MCU. The MCU then mixes the reduced-resolution video signals received from each terminal to generate a final composite image and then transmitting the final image to each video conference terminal. This method is described in greater detail below.

First, a video signal is input from a video camera located within or coupled to the video conference terminal in real-time, as shown at step S1. The video signal is converted into a signal for digital signal processing in the converter 110, as shown at step S2. More specifically, the converter 110 converts an input RGB format VGA signal into a YCbCr format VGA signal.

Resolution of the YCbCr format VGA signal output from the converter 110 is then reduced in down scaling unit 120 and output preferably as a YCbCr format QVGA signal, as shown at step S3. The resolution-reduced digital video signal may be compressed, for example, through a MPEG-4 coding process, as shown at step S4. The compressed video signal is then transmitted to the MCU, as shown at step S5.

In the MCU, the video signal transmitted from each video conference terminal is inverse variable length-coded, as shown at step S6. A macroblock address of the video signal output from the inverse VLC unit 210 is then determined according to an arrangement region (i.e., a position where an image corresponding to the video signal is to appear) in a final image, as shown at step S7. Setting the macroblock address of the video signal in the address setting unit 220 will now be described in detail.

By considering an arrangement position of each image transmitted from the four video conference terminals, an absolute address is designated only for a macroblock at the left of each slide. An address increase value is set for the rest macroblocks except the macroblock at the left. Accordingly, by not setting an absolute address for all macroblocks but coding an address increase value, it is possible to reduce computing process and data quantity required for designating a macroblock address.

The output signal of the address setting unit 220 is variable length coded in the VLC unit 230, as shown at step S8. The signals output from the VLC unit 230 are then mixed in mixer 240, as shown at step S9, and a final composite image output from the mixer is transmitted to each video conference terminal, as shown at step S10. Herein, the video signal output from the mixer 240 forms one final image consisting of four images.

Figure 8:
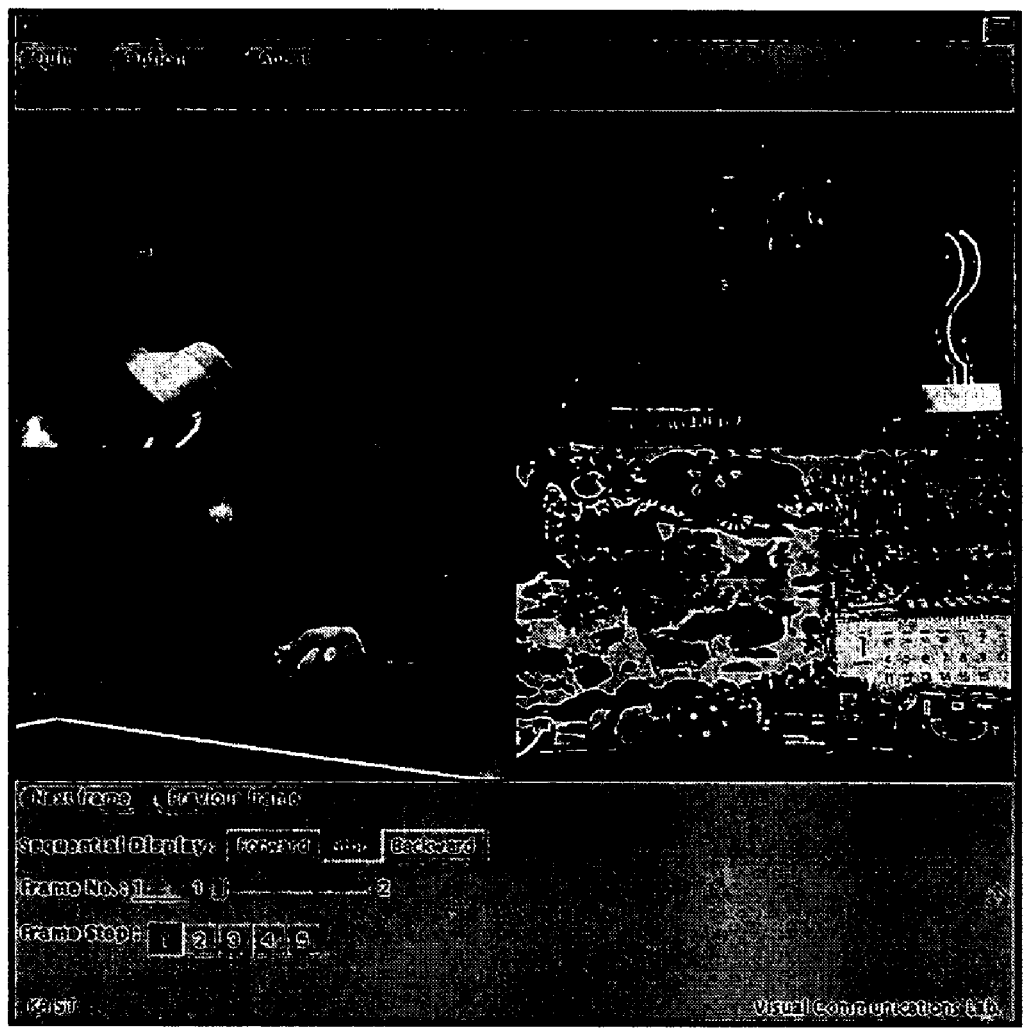
FIG. 8 shows an example of a final image that may be obtained by mixing resolution-reduced video signals in accordance with the system and method of the present invention.

FIG. 8 shows an example of a final image obtained by mixing resolution reduced video signals received from the four terminals, in the manner previously described.

In the digital video signal processing apparatus and method of the present invention, video signals are consecutively processed through an inverse VLC unit according to a no-loss coding process and then through a VLC unit. With this arrangement, it is possible to prevent picture quality deterioration.

In addition, through the address setting unit and the VLC unit, it is possible to reduce video signal processing time and computational complexity of the MCU and accordingly signal processing efficiency can be improved.

More specifically, it is possible to implement video signals having higher picture quality and less delay in a multipoint video conference system using the present invention compared with the related art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A digital video signal processing system implemented for a mobile communication system, comprising:
   a plurality of video conference terminals each including or coupled to a video camera; and
   a multipoint controller which mixes video signals received from the video conference terminals to generate a combined video signal and transmits the combined video signal to each of the video conference terminals, wherein the multipoint controller includes:
   an inverse coding unit which respectively inverse codes the video signals received from each of the video conference terminals:
   a position setting unit which sets positions of video signals output from the inverse coding unit:
   a coding unit which encodes the video signals output from the position setting unit; and
   a mixer which mixes video signals output from the coding unit into a final image corresponding to the combined video signal.

2. The apparatus of claim 1, wherein each of the video conference terminals includes:
   a scaler which reduces a resolution of a video signal received through the video camera; and
   a transmitter for transmitting the reduced-resolution video signal to the controller.

3. The apparatus of claim 1, wherein the position setting unit includes:
   an address setting unit which sets a macroblock address for each of the received video signals in the combined video signal.

4. The apparatus of claim 3, wherein the address setting unit sets an absolute address only for a macroblock corresponding to a predetermined position of each slice of a final image corresponding to the combined video signal.

5. The apparatus of claim 4, wherein the address setting unit codes an address difference value from a previous macroblock for a remainder of macroblocks in each slice of the final image, except the macroblock in which the absolute address is set.

6. The apparatus of claim 1, wherein each of the video conference terminal includes:
 a converter which converts a video signal received through the video camera into a digital video signal;
 a down scaling unit which reduces a resolution of the digital video signal;
 an encoding unit which compresses an output signal of the down scaling unit; and
 a transmitter which transmits an output signal of the encoding unit to the multipoint controller.

7. The apparatus of claim 6, wherein the converter converts an RGB (Red-Green-Blue) format signal received through the video camera into a YCbCr format video signal.

8. The apparatus of claim 1, wherein the position setting unit sets an absolute address only for a macroblock placed at a predetermined position of each slice of the final image.

9. The apparatus of claim 8, wherein the position setting unit codes an address difference value from a previous macroblock for a remainder of the macroblocks in each slice of the final image except the macroblock at the predetermined position.

10. The apparatus of claim 1, wherein the inverse coding unit includes an inverse VLC (variable length coding) unit and the coding unit includes a VLC unit.

11. A digital video signal processing system for a mobile communication system, comprising:
 a converter which converts a video signal received through a video camera into a digital video signal;
 a down scaling unit which reduces a resolution of the digital video signal;
 an encoding unit for compressing an output signal of the down scaling unit;
 a transmitter which transmits the reduced-reduction compressed video signal;
 an inverse VLC unit for decoding the transmitted reduced-resolution compressed video signal through inverse variable length coding, along with other transmitted reduced-resolution compressed video signals;
 an address setting unit for setting a macroblock address for each video signal output from the inverse VLC unit;
 a VLC unit which compresses the address set-video signals output from the address setting unit through variable length coding; and
 a mixer which mixes the compressed video signals output from the VLC unit to form a final image.

12. The apparatus of claim 11, wherein the digital video signal is a YCbCr format video signal.

13. The apparatus of claim 11, wherein the encoding unit implements moving picture compression by a MPEG-4 method.

14. The apparatus of claim 11, wherein the address setting unit sets an absolute address only for a predetermined macroblock column for each compressed video signal included in the final image.

15. The apparatus of claim 11, wherein the address setting unit codes an address difference value from a previous macroblock for a remainder of macroblocks corresponding to each compressed video signal in the final image except the macroblock at the predetermined position.

16. A digital video signal processing method for a mobile communication system, comprising:
 reducing resolution of a video signal from a video camera;
 transmitting the reduced-resolution video signal to a multipoint controller; and
 receiving a composite image from the controller, the composite image formed from the reduced-resolution video signal transmitted to the multipoint controller and at least one other reduced-resolution video signal, wherein the composite image is generated by:
 inverse coding the reduced-resolution video signals;
 setting a position for each video signal output from the inverse coding;
 coding the address-set video signals; and
 mixing the variable length coded-video signals to form the composite image.

17. The method of claim 16, wherein the resolution-reducing step includes:
 converting the video signal from the video camera into a digital video signal of a predetermined format; and
 reducing resolution of the digital video signal by performing moving picture compression, said compressed reduced-resolution video signal being transmitted in the transmitting step.

18. The method of claim 17, wherein the predetermined format is a YCbCR format.

19. The method of claim 17, wherein the moving picture compression is performed in accordance with an MPEG-4 standard.

20. The method of claim 16, wherein said position setting includes:
 setting an arrangement region for each of the video signals output from the inverse coding;
 setting an absolute address of a macroblock corresponding to each of the video signals output from the inverse coding step, said macroblock address corresponding to a predetermined position in the composite image; and
 coding an address of a remainder of the macroblocks for each video signal except the macroblock at the predetermined position as a difference value from a previous macroblock.

21. The method of claim 16, wherein the inverse coding includes inverse variable-length coding and the coding includes variable-length coding.

22. A digital video signal processing method for a mobile communication system, comprising:
 converting a video signal received from a video camera into a digital video signal of a predetermined format;
 reducing resolution of the digital video signal;
 compressing the resolution-reduced video signal and transmitting it to a multipoint controller;
 decoding the transmitted video signal through inverse variable length coding;
 setting a macroblock address of the decoded video signal;
 encoding the video signal through variable length coding;
 performing the decoding, setting, and encoding steps for at least one other transmitted video signal; and
 mixing the encoded video signals to form a final image and transmitting the final image to a video conference terminal coupled to the video camera, wherein the macroblock address setting step includes:
 setting an arrangement region of the decoded video signal within the final image;
 setting an absolute address of a macroblock at a predetermined position within the arrangement region of the final image; and
 coding an address of a remainder of macroblocks corresponding to the decoded video signal except the macroblock at the predetermined position as a difference value from a previous macroblock.

23. The method of claim 22, wherein the predetermined format is a YCbCr format.

24. The method of claim 22, wherein the compressing step is implemented in accordance with an MPEG-4 standard.

25. A video conferencing system, comprising:
a plurality of mobile terminals each transmitting a video signal derived from a camera; and
a multipoint controller which generates a composite video signal from the video signals transmitted from the mobile terminals, and which transmits the composite video signal to the mobile terminals, wherein the multipoint controller includes:
a first coder which inverse codes the video signals from the terminals;
a setting circuit which sets positions of video signals from the coding unit;
a second coder which encodes the video signals from the setting circuit; and
a mixer which mixes video signals from the second coder to form a final image corresponding to the combined video signal.

26. The system of claim 25, wherein each of the mobile terminals includes:
a processor that transforms the video camera signal into a reduced-resolution video signal;
a transmitter that transmits the reduced-resolution video signal to the multipoint controller.

27. The system of claim 26, wherein the processor includes:
a converter which converts a video camera signal from a first format into a second format;
a scaler which reduces a resolution of the converted video signal by a predetermined factor.

28. The system of claim 27, wherein the first format is a VGA RGB format and the second format is a VGA YCbCr format.

29. The system of claim 27, further comprising:
a compressor which compresses the reduced-resolution video signal.

30. The system of claim 29, wherein the compressor compresses the reduced-resolution video signal based on an MPEG-4 standard.

31. The system of claim 25, wherein the first coder includes an inverse variable-length coder and the second coder includes a variable-length coder.

32. A method for providing video conference services in a mobile communication system, comprising:
receiving video signals from a plurality of mobile terminals;
generating a composite video signal from the received video signals; and
transmitting the composite video signal to the mobile terminals, wherein generating the composite video signal includes:
performing inverse coding for each of the received video signals;
setting an address in the composite video signal for each of the video signals which have been inverse coded;
coding the address-set video signals; and
combining the coded, address-set video signals.

33. The method of claim 32, wherein said setting includes:
setting an absolute address for one macroblock in each video signal, said absolute address corresponding to a predetermined position in the composite video signal; and
setting addresses of remaining macroblocks in each video signal based on an address difference value applied relative to a previous macroblock.

34. The method of claim 32, wherein the video signals from each of the terminals is generated by:
transforming a video camera signal into a reduced-resolution video signal; and
transmitting the reduced-resolution video signal to a multipoint controller.

35. The method of claim 34, wherein transforming includes:
converting the video camera signal from a first format into a second format;
reducing a resolution of the converted video signal by a predetermined factor.

36. The method of claim 35, wherein the first format is a VGA RGB format and the second format is a VGA YCbCr format.

37. The method of claim 35, further comprising:
compressing the reduced-resolution video signal prior to the transmitting step.

38. The method of claim 37, wherein the compressing step is performed based on an MPEG-4 standard.

39. The method of claim 32, wherein said inverse coding includes inverse variable-length coding and said coding includes variable-length coding.

* * * * *